US012000563B2

(12) United States Patent
Van Delden

(10) Patent No.: US 12,000,563 B2
(45) Date of Patent: Jun. 4, 2024

(54) LIGHTING SYSTEM AND ARTIFICIAL WINDOW

(71) Applicant: SIGNIFY HOLDING B.V., Eindhoven (NL)

(72) Inventor: Martinus Hermanus Wilhelmus Maria Van Delden, Venlo (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/641,711

(22) PCT Filed: Sep. 10, 2020

(86) PCT No.: PCT/EP2020/075335
§ 371 (c)(1),
(2) Date: Mar. 9, 2022

(87) PCT Pub. No.: WO2021/052858
PCT Pub. Date: Mar. 25, 2021

(65) Prior Publication Data

US 2022/0341552 A1 Oct. 27, 2022

(30) Foreign Application Priority Data

Sep. 17, 2019 (EP) .................................... 19197651

(51) Int. Cl.

| | |
|---|---|
| *F21S 8/02* | (2006.01) |
| *F21S 8/04* | (2006.01) |
| *F21V 5/04* | (2006.01) |
| *F21V 21/04* | (2006.01) |
| *H05B 45/28* | (2020.01) |
| *F21Y 115/10* | (2016.01) |

(52) U.S. Cl.
CPC ................ *F21S 8/024* (2013.01); *F21S 8/04* (2013.01); *F21V 5/045* (2013.01); *F21V 21/041* (2013.01); *H05B 45/28* (2020.01); *F21Y 2115/10* (2016.08)

(58) Field of Classification Search
CPC .. F21S 8/024; F21S 8/04; H05B 45/28; F21V 21/041
See application file for complete search history.

(56) References Cited

U.S. PATENT DOCUMENTS

| | | | | |
|---|---|---|---|---|
| 9,488,327 | B2 | 11/2016 | Van Gheluwe et al. | |
| 2013/0307420 | A1 | 11/2013 | Yoder et al. | |
| 2018/0246270 | A1* | 8/2018 | Di Trapani | F21S 8/006 |

(Continued)

FOREIGN PATENT DOCUMENTS

| | | | |
|---|---|---|---|
| WO | 9014782 | A1 | 12/1990 |
| WO | 2006129268 | A2 | 12/2006 |

(Continued)

*Primary Examiner* — Christopher E Dunay

(57) ABSTRACT

The invention relates to a lighting system comprising a light area and a side wall around the light area defining a recess. The light area is located at a base of the recess and a light exit window is located downstream at a top of the recess opposite the light area. The side wall comprises a first wall portion and a second wall portion located upstream of the first wall portion. A clear, transparent pane is provided in between the first and second wall portion, wherein (essentially the whole of) the second wall portion is screened by the first wall portion from a direct line of view through the light exit window.

15 Claims, 5 Drawing Sheets

(56) References Cited

U.S. PATENT DOCUMENTS

| | | | | |
|---|---|---|---|---|
| 2018/0252374 | A1* | 9/2018 | Keller | F21S 19/005 |
| 2019/0159317 | A1* | 5/2019 | Harada | H05B 45/22 |
| 2019/0295519 | A1* | 9/2019 | Krass | G02B 6/0051 |
| 2019/0360661 | A1* | 11/2019 | Di Trapani | F21V 11/06 |
| 2022/0196904 | A1* | 6/2022 | Fujii | F21V 9/40 |
| 2022/0243892 | A1* | 8/2022 | Xiang | H05B 45/20 |
| 2022/0357017 | A1* | 11/2022 | Molteni | F21V 3/04 |

FOREIGN PATENT DOCUMENTS

| | | | |
|---|---|---|---|
| WO | 2014191250 | A1 | 12/2014 |
| WO | 2018157903 | A1 | 9/2018 |

* cited by examiner

LIGHTING SYSTEM AND ARTIFICIAL WINDOW

CROSS-REFERENCE TO PRIOR APPLICATIONS

This application is the U.S. National Phase application under 35 U.S.C. § 371 of International Application No. PCT/EP2020/075335, filed on Sep. 10, 2020, which claims the benefit of European Patent Application No. 19197651.3, filed on Sep. 17, 2019. These applications are hereby incorporated by reference herein.

FIELD OF THE INVENTION

The invention relates to a lighting system and an artificial window.

BACKGROUND OF THE INVENTION

Artificial skylight devices are a relatively new class of devices drawing a lot of attention lately. Their aim is to provide human beings with a sense of being connected to nature whilst indoor where they may be fully or partially deprived from access to natural light. Examples of such indoor spaces are offices, corridors, subways, underground metro and train-stations, tunnels, hospitality areas, hospitals, planes, submarines, etc. etc. At present there exist many different artificial skylights ranging from (very) low-end, low-cost and static (backlit) posters to the more expensive, high-res dynamic TV and/or projector based devices towards the (almost) unpractical, unaffordable, huge size and weight, high-volumetric, high-tech devices, deploying wavelength-dependent nano-particle scattering, known as Rayleigh scattering (the reason for which the sky is blue). A relatively simple and low-cost artificial skylight device is known from U.S. Pat. No. 9,488,327 B2. This device consists of a recessed panel acting as a diffuse light source representing the blue sky, and a set of one or more side walls, comprising triangular shaped portions that can be backlit, thereby mimicking a sun struck portion whilst simultaneously providing a visual cue towards the position of a distant sun in the sky. However, this known artificial skylight device has the disadvantage that it provides only a moderate realistic sensation of a real window or skylight.

SUMMARY OF THE INVENTION

It is an object of the invention to counteract the disadvantage of the known artificial skylight device. Thereto the invention proposes a lighting system comprising a light area extending transverse to a main, axial direction, and

- a side wall extending downstream from the light area, defining a recess with a cross section,
- wherein the light area is located at a base of the recess and a light exit window is located downstream at a top of the recess opposite the light area,
- wherein the side wall comprises a first wall portion and a second wall portion located upstream of the first wall portion, and
- wherein a transparent pane is provided in between the first and second wall portion, and
- wherein essentially the whole second wall portion is screened by the first wall portion from a direct line of view through the light exit window.

In the context of this invention the expression "essentially" it be understood as almost completely or completely and the following should be considered that, for example, parts of the inner surface of the second wall portion of the side wall by which it already screened from said direct view, for example by parts to which said second wall portion of the side wall is attached to other parts, are not necessarily screened by the first wall portion. Furthermore, it is evident that screening of the second wall portion relates to an inner surface of the second wall portion, i.e. the side of the second wall portion that faces toward the transparent pane.

It was found that the lack of realistic sensation/effect is caused a.o. by reflections of the backlit sidewalls which appear as blurred and smeared-out portions at the diffuse surface of the recessed panel. The issue with these blurred and smeared-out reflections is that the sky portion now appears as a surface having differently colored portions, which are visible along two or more sides of the recessed panel. Consequently, the human eye is enabled to focus at the plane of origin of the color difference, being the panel's surface/light area, thereby significantly reducing the sensation of depth. Moreover, the negative impact of the reflections can be so strong, for example when the whole circumferential first wall portion is lit/backlit, that a clearly visible circle of different color arises in the center of the light area ("sky"), which further reduce the sense of depth. Then, also the overall illusion of the artificial skylight is compromised, whilst a reference to the position of the sun in the sky has vanished, as there is no more sharp shadow. Various options are envisaged to overcome these issues, yet most options having a specific other drawback. For example, one option to reduce the negative impact of the backlit sidewall is to decrease their visibility by decreasing the light intensity of the backlight portions. However, at that point the intensity of the artificial "sun" becomes so weak that the realistic illusion collapses. Another option is to increase the vertical distance between the first wall portion and the recessed light area, for example in deploying a more forgiving sky configuration such as an indirect lit (half) dome, ellipse, sphere, tubular cavity of any other integrating body (acting as the sky). Yet, this goes at the expense of a significant increasing in the total build-in depth of the device, in particular for the devices having a large sky area. Yet another option is to tilt the sidewalls outwards, such that hardly any light is directed towards the light area (sky portion), as implemented by Mitsubishi and COELUX having slanted sidewalls.

The lighting system may have the feature that the light area is formed by a LED panel having a diffuse surface thus improving the effect of infinity. Such a LED panel may be LEDs mounted on a carrier combined with a separate diffuser or with an integral diffuser. Said diffuser comprises said diffuse surface and is arranged in between the carrier and the transparent pane. Said separate diffuser might be spaced from said carrier, but alternatively may be arranged on the surface of said carrier. Yet, the diffuser is arranged in between the array of LEDs and the transparent pane for diffusing the light issued by the LEDs during operation.

The approach of the current invention disclosure is to prevent that the reflections of the sidewalls become blurred. This is achieved in deploying a clear and transparent window in between the recessed panel and the one or more (backlit) side walls. Furthermore, upstream of the pane, a second wall portion and a homogenous diffuse lit surface, such as a very diffuse and homogenous lit sky-blue recessed LED panel, are provided with a viewing angle limiting frame height of the first wall portion being large enough to restrict a direct line of view through the light exit window at the second wall portion and the frame of the sky-panel, such that there are no witnesses to the origin of the sky whilst simultaneously providing the feeling of sufficient structural integrity of a (suspended) ceiling. It appeared that the second wall portion should not be visible through the transparent pane as this reduces the realistic effect of the artificial window.

The benefits of such a clear pane or sheet of material, for example made of PC, PMMA or (window) glass, is that:

the sheet or pane acts as a semi-mirror, and that grazing angle light-rays are redirected towards the opposing side walls, thereby reducing the amount of sidewall light that can reach the diffuse surface of the recessed panel in the first place.

The positive impact of having an intermediate pane of a clear material in between the light area and the first wall portion is that as a first visual cue, clear and sharp reflection of the "sun struck" inner first wall portion is clearly visible, and in symmetric proportions, at both sides of the clear glass pane. Further, and as a second visual cue, both the real and reflected image of the shadow portions provide clear guidance towards the position of the virtual sun in the sky, without the need to see the sun. Furthermore, and as a third cue, the glass pane also shows reflections (virtual images) of other objects in the space below the canopy, appearing as augmented images in the sky, in a plane of focus beyond the surface of the glass pane. The second wall portion being screened by the first wall portion from a direct line of view through the light exit window counteracts the potential, unrealistic disturbance of the reflections (virtual images) by the visibility of the second wall portion. Hence, together, with the blue sky being uniform in appearance, and as there are no indicators that provide a measure for the "distance" towards the sky, the depth of the blue sky light area is felt as infinite.

Typically the side wall is dimensioned such that it can be considered an extension in the axial direction of the perimeter of the light area, in other words the side wall can be considered a wall around the light area, which is extended in a downstream, axial direction. Typically the transparent pane is essentially non-diffusing and non-scattering and positioned directly opposite the light area, i.e. there is no separate pane, sheet or plate in between the light area and the transparent pane and substantially all light from the light area directly impinges on the transparent pane.

The lighting system could have the feature that the transparent pane is specular Fresnel reflective. The Fresnel reflection of the clear, transparent being specular further enhances the sense of depth because of the sharpened reflection image and thus improves the suggestion of a realistic window. Typically, the lighting system can have the feature that the transparent pane extends over the full cross sectional area Ra of the recess at the first wall portion to further enhance the desired realism of the artificial skylight solution.

The lighting system could have the feature that the first wall portion is capable of emitting light. Thereto the light area, either is a light transmitting area such as a side-lit light guide, or is a light generating area (and can also be referred to in the description as a light generating area), such as backlit area or OLED, could comprise a light source. The use of lighting on the side walls helps to increase the realism of the lighting system. The light source is then intended to replicate natural daylight, or even natural lighting from the moon or stars. When the light area and first wall portion are being lit in the right proportions/ratios, the artificial sky comes with an even improved, strong feel of depth, with the depth extending far beyond the surface of the clear, transparent pane. Further, some of the light originating from the backlit sidewalls preferably reach the opposing non-lit sidewall surfaces, in order to "neutralize" the bluish appearance of those sidewalls as results from the blue-sky engine. In this way, the illuminated side wall or side walls compensate for the incident blue light from the artificial skylight, so the walls of the recess appear white (or any other color/color temperature of the sunlight that is desired) to an observer. Apart from the color issue, bright recess walls enhance the realism of the sunlight effect. The lighting system can be used as or comprised in an artificial window in a ceiling, but it can also be used as or comprised in an artificial vertical window in a wall.

The lighting system can have the feature that the sidewall, the first and second wall portion thereof are circumferential around the recess and wherein the first wall portion is provided with a lighting arrangement for controlling at least one of color, intensity, contrast of the illumination, and shape from which light is provided by at least (a part of) one sub-wall of the first wall portion. Then the lighting system has a circumferential side wall of which the first wall portion comprises a set of side sub-walls, wherein each side sub-wall comprises a rectangular light emitting area. This defines a basic recess for a polygonal panel.

In a first example, again with a set of side walls, each side wall can comprise a rectangular light emitting area formed from two independently controllable triangular light emitting areas. With one triangle illuminated, an effect of a sharp boundary can be created, which can replicate the sharp lines created by a distant point light source such as the sun. In this way, a triangular illumination shape can appear to have been created by a sunlit light transmitting or generating area. If both triangles are illuminated, the side wall can appear to face the sun, whereas if one is illuminated the side wall can appear to be laterally disposed with respect to the sun. If neither triangle is illuminated, the side wall can appear to be in the shade.

In another example, again with a set of side walls, each side wall can comprise a rectangular light emitting area formed from four independently controllable triangular light emitting areas, each having an apex at the center of the rectangular area. This means that triangles can be defined with opposite slopes. This means the lighting system does not need to be oriented in any particular way in order for the shadows created by the sun to be replicated.

In another example, again with a set of side walls, two side walls can each comprise a rectangular light emitting area formed from a plurality of independently controllable triangular light emitting areas, each having an apex at one corner of the rectangular area. This means that triangles can be defined with varying slopes. This means the lighting system can replicate the lines cast by the sun at different heights in the sky representing different times of day. There can be four side walls, wherein the two side walls (with the multiple triangles) face each other, and the other two side walls are provided with a plurality of rectangular light emitting areas. The laterally disposed side walls (with respect to the direction of incoming light from the sun) have the triangles, whereas the front and back walls have the rectangles. This means all four side walls can be controlled to provide an overall impression matching sun illumination from a particular sun position. The light transmitting or light generating area typically comprises a rectangle or square, but other shapes are possible.

The light source can provide a first color for light emitted in a normal direction with respect to the light generating area, and a second, different, color for light emitted in a direction offset from the normal direction. For example, the second color can have a greater blue component than the first color. This arrangement functions as an artificial skylight, i.e. a system which provides an appearance aiming to replicate the appearance of a ceiling window when illuminated by daylight (either direct sunlight or general light for example as would be seen during a cloudy day). This arrangement provides whiter downward task light, representing the sun, and bluer light in other directions, representing the sky during daylight hours. The side wall illumination can prevent the side walls appearing blue, which does not match the effect observed through a real window.

As explained above, even further desired realism can be obtained by forming a sharply demarcated light/dark boundary. These measures can be used to greatly enhance the realism of the artificial skylight solution.

5/6/7/14. In a first configuration, the lighting system can have the feature that the first wall portion has a height H1 which comprises a transverse wall portion extending at the transparent pane in a radial direction over a width Wt into the recess having a width Wr for screening the second wall portion having a height H2 from said direct line of view, wherein $$H2 <= H1 * Wt/(Wr - Wt).$$

Alternatively, in a second configuration, the lighting system can have the feature that the first wall portion has a height H1 which is offset from the second wall portion by a distance D in a radial direction into the recess having a width Wr for screening the second wall portion with a height H2 from said direct line of view, wherein $$H2 <= H1 * D/(Wr - 2 * D).$$

In both the first and second configuration it is thus ensured that the second wall portion is not visible through the light exit window and hence that the desired realism of the artificial skylight is not negatively affected. In practice the height H2 of the second wall portion could be practically zero, but typically is more than zero. The second wall portion is that portion of the side wall which is in between the light area and the transparent pane and forms a very small space between the light area and the transparent pane. Yet, preferably the second wall portion has a small height H2 and the light area and the transparent pane are spaced apart by a distance H2 in the range of 0.1-7.5 cm, preferably 0.5-5 cm, most preferably 0.5-1.5 cm. In practice it appeared that 7.5 cm is the upper limit of the height H2 as otherwise the size of the cross sectional area Ra of the recess at the first wall portion becomes too small and/or the height H1 of the first wall portion becomes too large resulting in a too high built-in depth of the lighting system. Hence, from this point of view, height H2 should be as small as possible and that a preferred upper limit for H2 is 5 cm. On the other hand, height H2 should be large enough to avoid optical contact between the light area and the transparent pane, so at least 0.1 cm, but rather it preferably is large enough to house an object for further enhancement of the realism of the artificial skylight solution. Hence, H2 preferably is in the range of 0.5 cm to 1.5 cm. To house an object for said further enhancement of the realism, the lighting system can have the feature that at least one object chosen from a handlebar, a stain and an artificial drop of birds-po, tree leaves, rain drops, and/or sand grains, is to sit at the clear pane, or to sit within a space between the light area and the clear transparent pane.

The lighting system can have the feature that the transparent pane is made of clear, colorless glass, PMMA or PC. These materials are typically used and convenient for use as window panes and resemble a real window glass pane as much as possible and thus enhance the desired realism of the artificial skylight solution.

The lighting system can have the feature that the second wall portion has a white colored, diffuse reflective surface facing the recess. It appeared that such a configuration of the second wall portion the effect of the second wall portion on the desired realism of the artificial skylight solution is improved compared to other configurations of the second side wall. Also in the case the second wall portion is unintentionally not fully screened from a direct line of view through the light exit window, the desired realism of the artificial skylight solution is satisfactorily maintained.

The lighting system can have the feature that the first wall portion has a white colored, diffuse reflective surface facing the recess. Thus the visibility of the reflection of (virtual images) of the first wall portion in the clear transparent pane appearing as augmented images in the sky is enhanced, and hence the desired realism of the artificial skylight solution is enhanced.

The first wall portion can emit white and/or colored light for example with a Lambertian intensity distribution. Yet, the lighting system can have the feature that the light area emits light with a color temperature or color correlated color temperature in the range of 6500-20000K, comprising both overcast sky and clear blue sky color temperatures, preferably in the range of 9000-15000K relating to clear blue sky color temperatures. Additionally or alternatively, the lighting system can have the feature that the first wall portion emits light with a color temperature or color correlated color temperature in the range of 3500-6000K, preferably in the range of 4000-5500K. In either of these solutions, the appearance of the side wall can be made to match the lighting effect being desired from the light area.

Use of the lighting system according to the invention as an artificial window or a recessed wall arrangement. In particular indoor spaces such as offices, corridors, subways, underground metro and train-stations, tunnels, hospitality areas, hospitals, planes, submarines, where there is fully or partially absence of natural light, are suitable application areas for the lighting system according to the invention.

BRIEF DESCRIPTION OF THE DRAWINGS

The invention will now be further explained by means of the schematic drawings which are intended to elucidate the invention rather than to limit the scope of the invention, thereto some dimensions may not be up to scale but may be exaggerated for explanation purposes. In the drawings.

DETAILED DESCRIPTION OF PREFERRED EMBODIMENTS

Figure 1:
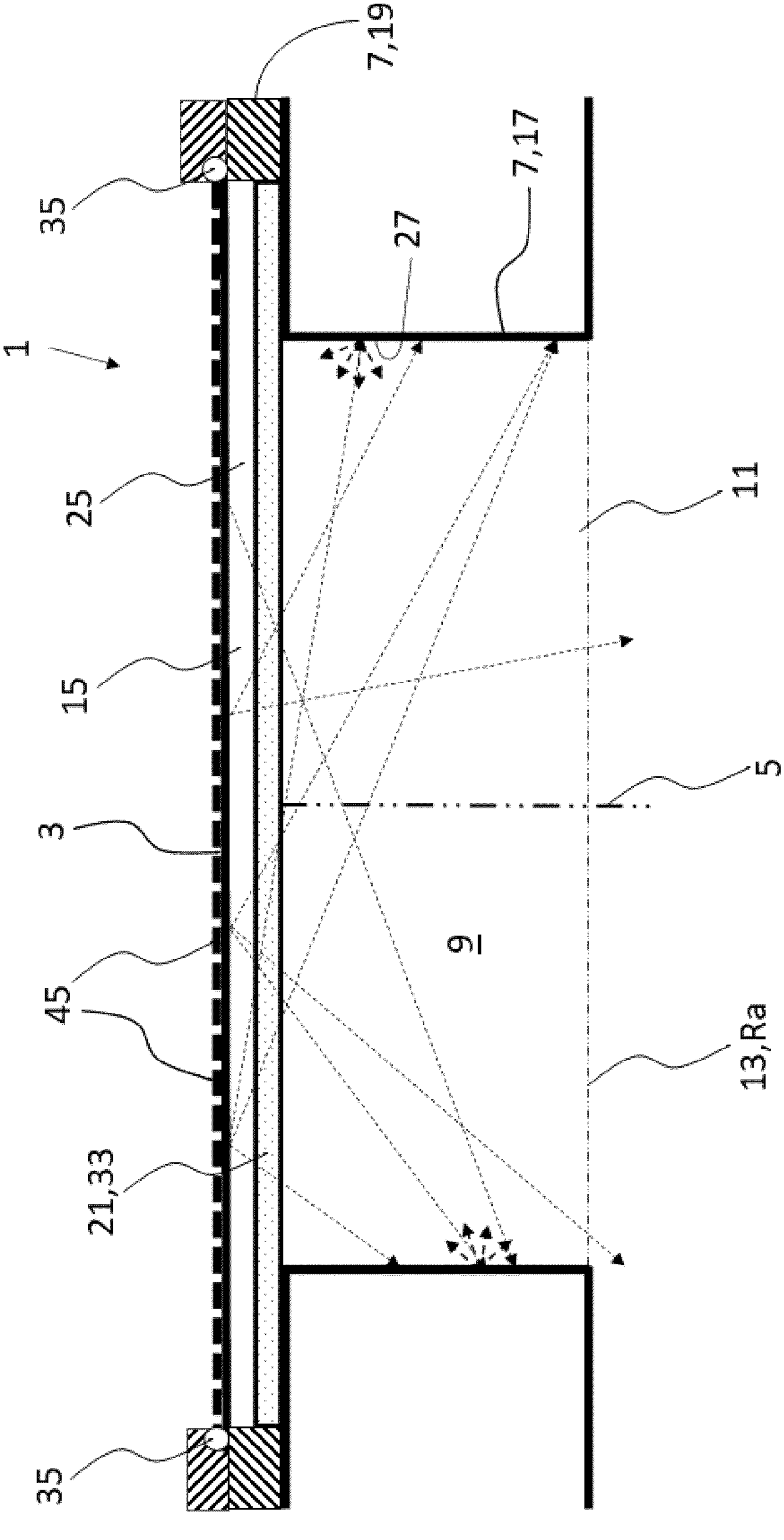
FIG. 1 shows a first embodiment of a lighting system according to the invention.

FIG. 1 shows a first embodiment of an artificial window, for example an artificial skylight, of a lighting system 1 according to the invention. The lighting system comprises a light area 3 (also referred to as light generating area or light transmitting area) extending transverse to a main, axial direction 5, and a side wall 7 extending downstream from the light area, defining a recess 9 with a cross section Ra. The light area is located at a base 11 of the recess and a light exit window 13 is located downstream at a top 15 of the recess opposite the light area. The side wall comprises a first wall portion 17 and a second wall portion 19 located upstream of the first wall portion, and a transparent pane 21 is provided in between the first and second wall portion. The second wall portion is screened by the first wall portion from a direct line of view through the light exit window, in that the first wall portion is offset from the second wall portion in a radial direction into the recess. This is further explained in FIG. 3A. The transparent pane, the light area and the second wall portion define a space 25 which can house an object. The transparent pane is clear and colorless, is made from PMMA and exhibits a specular Fresnel reflection. The first wall portion is coated with a white, diffuse reflective coating 27 of white paint. The light generating area comprises a side-lit light guide 33 provided with an outcoupling structure 45 and with LEDs as a light source 35.

Figure 2:
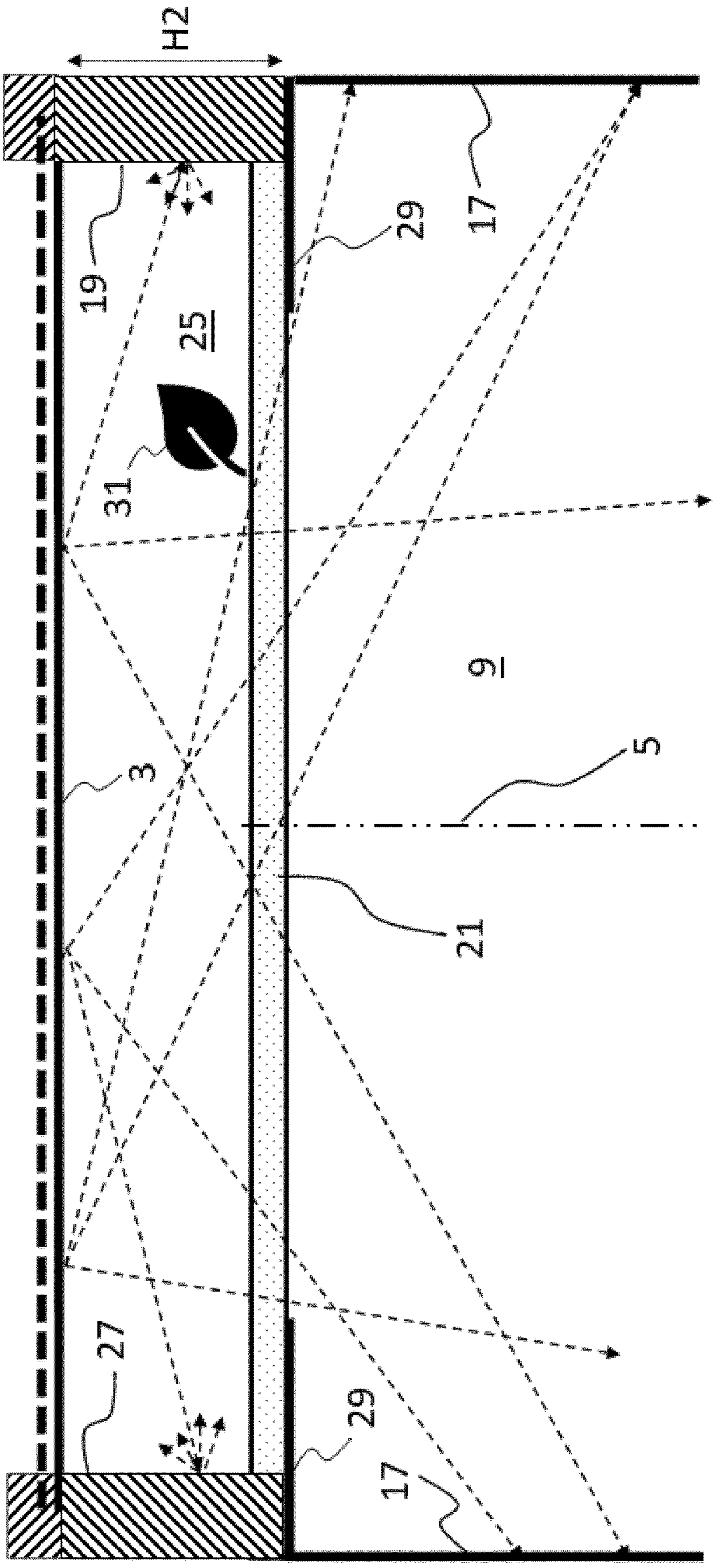
FIG. 2 shows a second embodiment of a lighting system according to the invention.

FIG. 2 shows a second embodiment of an artificial window of a lighting system 1 according to the invention. The second embodiment of the lighting system is similar to the first embodiment, but yet differs in that the first wall portion 17 comprises a transverse wall portion 29 extending at the transparent pane 21 in a radial direction with respect to main axis 5 into the recess 9 for screening the second wall portion 19 from said direct line of view. This is further explained at the hand of FIG. 3B. Furthermore, said second embodiment comprises a relatively large space 25, formed by the light area 3, the transparent pane and the second wall portion to house an object 31, in the figure a tree leaf. Due to relatively large height H2 of the second wall portion, it unintentionally could be visible through the light exit window 13, and thereto the second wall portion is provided with a white diffuse reflective coating 27 of aluminum oxide.

Figure 3A:
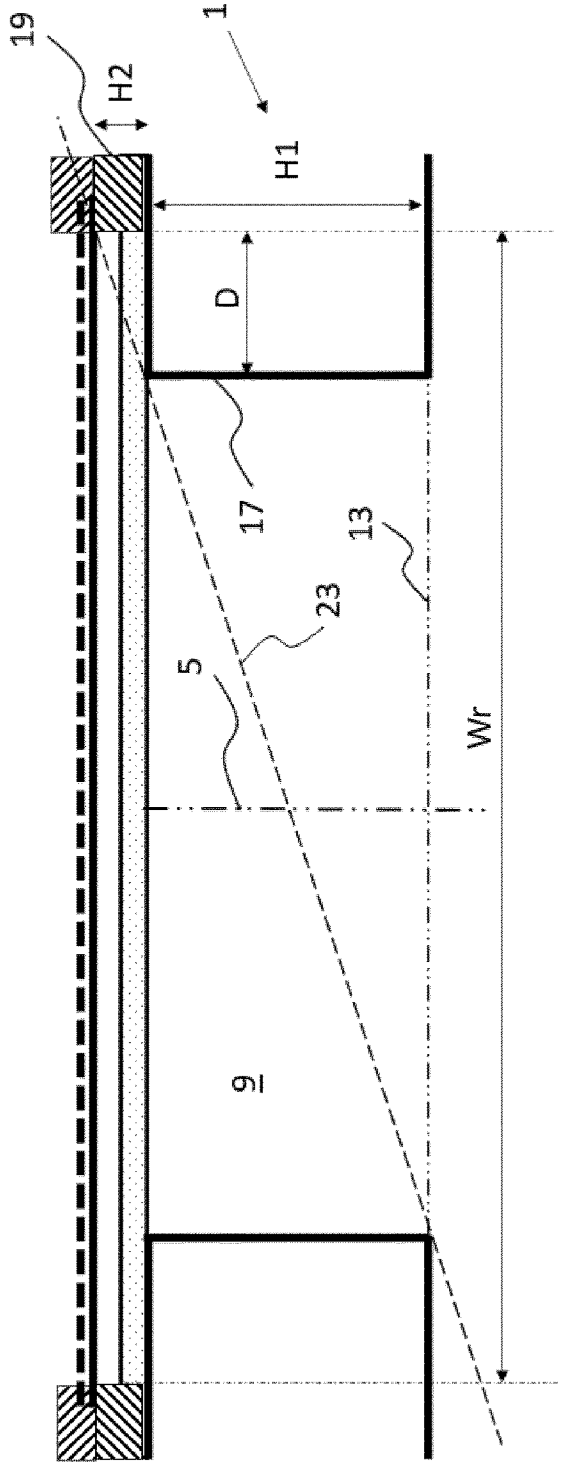
FIG. 3A-B shows the conditions for screening of the second wall portion for the first and second embodiment.
Figure 3B:
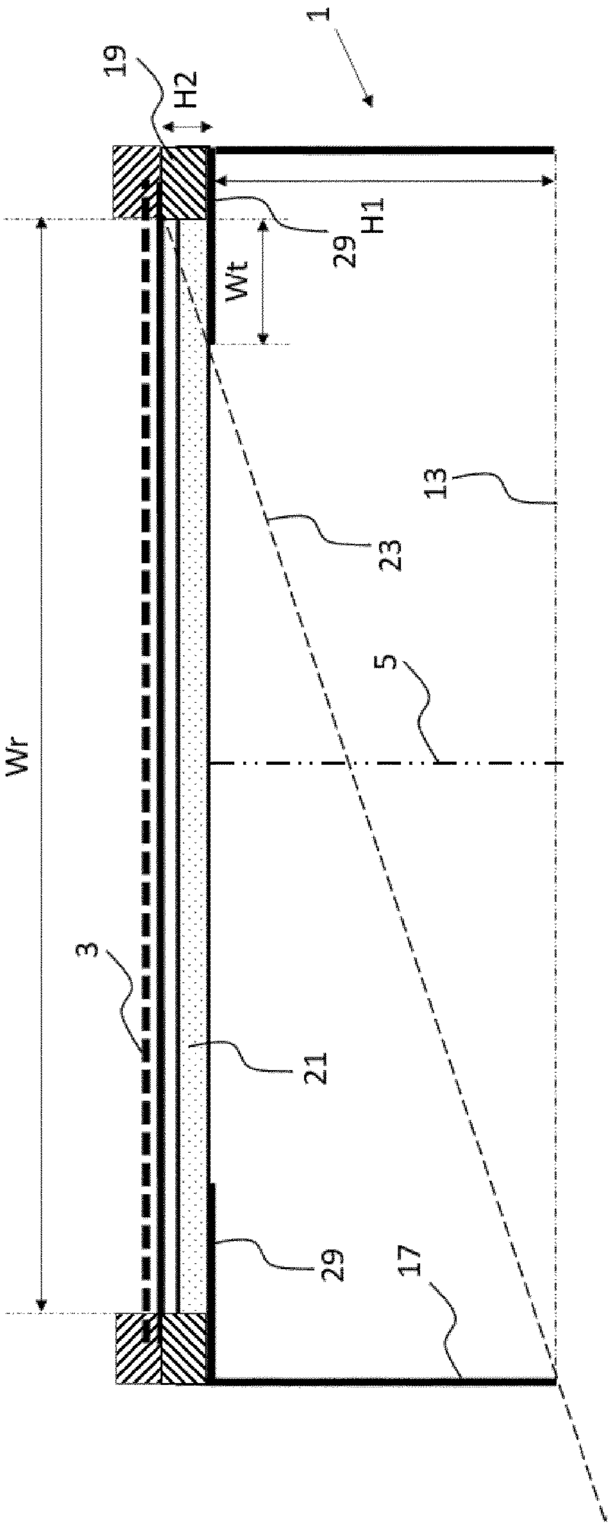

FIG. 3A-B shows the conditions for screening of the second wall portion for the first and second embodiment. FIG. 3A shows the lighting system 1 according to the first embodiment shown in FIG. 1. In this first embodiment the first wall portion 17 has a height H1 which is offset from the second wall portion 19 by a distance D in a radial direction with respect to main axis 5 into the recess 9 having a width Wr, here being the width of the light exit window 13, for screening the second wall portion with a height H2 from a direct line of view 23, wherein $$H2<=H1*D/(Wr-2*D).$$

FIG. 3B shows the lighting system 1 similar to the second embodiment shown in FIG. 2. In this second embodiment the first wall portion 17 has a height H1 which comprises a transverse wall portion 29 extending at the transparent pane 21 in a radial direction with respect to main axis 5 over a width Wt into the recess 9 having a width Wr, here being the width of light generating area 3, for screening the second wall portion 19 having a height H2 from said direct line of view 23 through the light exit window 13, wherein $$H2<=H1*Wt/(Wr-Wt).$$

Figure 4:
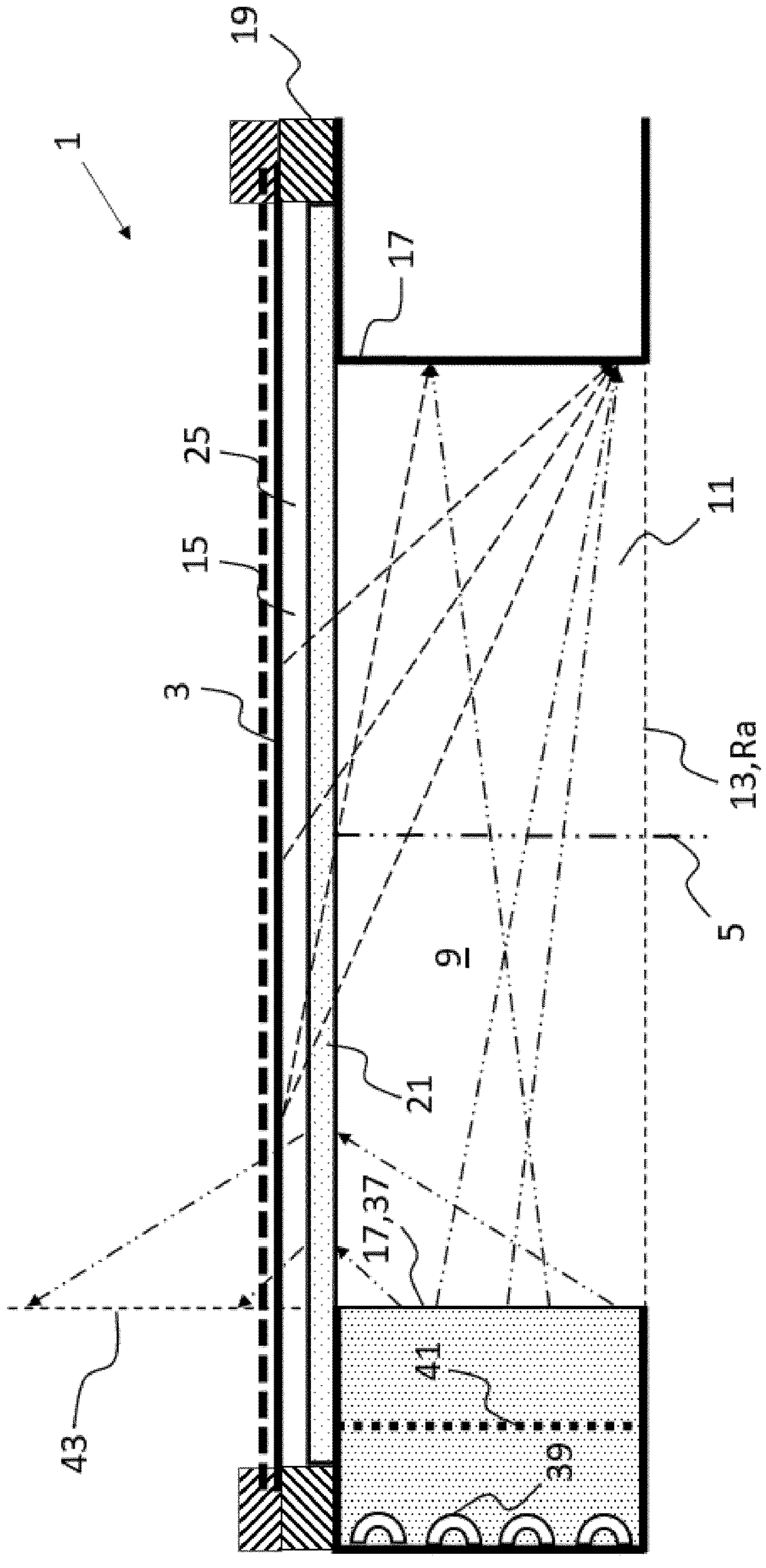
FIG. 4 shows a third embodiment of a lighting system according to the invention.

FIG. 4 shows a third embodiment of an artificial window, for example a recessed wall portion, of a lighting system 1 according to the invention. The lighting system comprises a light area 3 extending transverse to a main, axial direction 5, and a side wall 7 extending downstream from the light area, defining a recess 9 with a cross section Ra. The light area is located at a base 11 of the recess and a light exit window 13 is located downstream at a top 15 of the recess opposite the light area. The side wall comprises a first wall portion 17 and a second wall portion 19 located upstream of the first wall portion, and a transparent pane 21 is provided in between the first and second wall portion. The second wall portion is screened by the first wall portion from a direct line of view through the light exit window, in that the first wall portion is offset from the second wall portion in a radial direction into the recess. The transparent pane, the light area and the second wall portion define a space 25 which can house an object. A part 37 of the first wall portion 17 is translucent and made light emitting. Thereto the first wall portion is backlit by an array of LEDs 39 and provided with a diffuser 41. In operation said part of the first wall portion is illuminated and a reflection of said part is visible as a virtual image 43 in the clear transparent pane, thus enhancing the desired realism of the artificial window.

Figure 5:
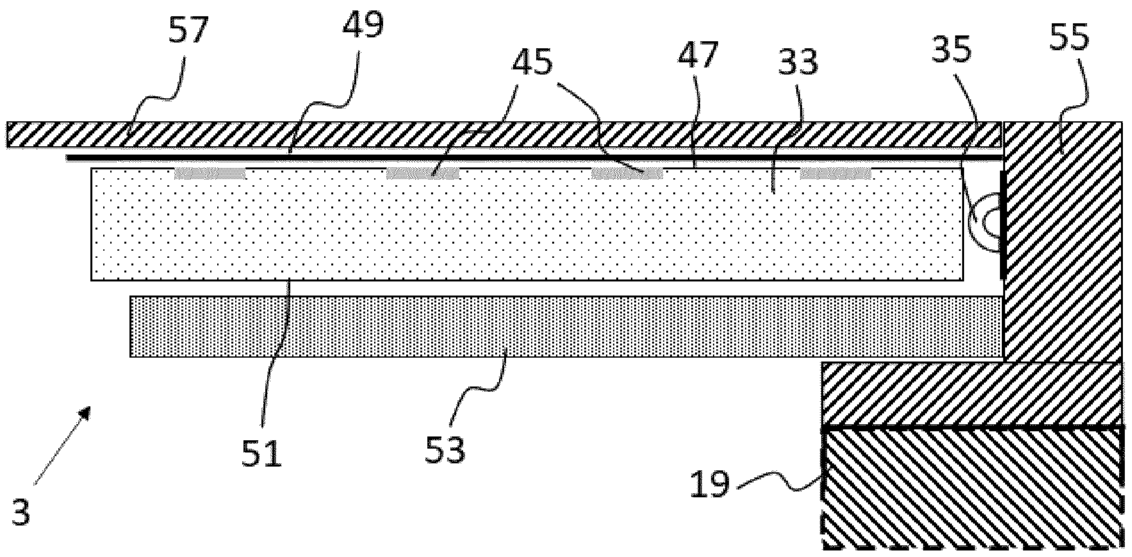
FIG. 5 shows a part of a detailed cross section of an embodiment of light area.

FIG. 5 shows a part of a detailed cross section of an embodiment of light area 3 as shown in FIG. 4. The light generating area comprises a clear, light transmissive light guide 33 side-lit by LEDs 35 and provided with a light out-coupling structure 45 on a first side, first main surface 47, facing a reflector 49. In front of a second side, main surface 51, of the light guide a diffuser 53 is provided. A clamp or housing wall 55 with cover 57 is provided to shield the LEDs from direct view, to maintain the various parts of the light generating area mutually positioned and to attach the light generating area to the second wall portion 19 (partially shown). In other embodiments the light guide plate can be back-lit instead of side lit, and at least one of the cover, the reflector and the outcoupling structure can be omitted. The diffuser can be scattering or homogenize light by beam widening via refraction or TIR (total internal reflection).

Figure 6:
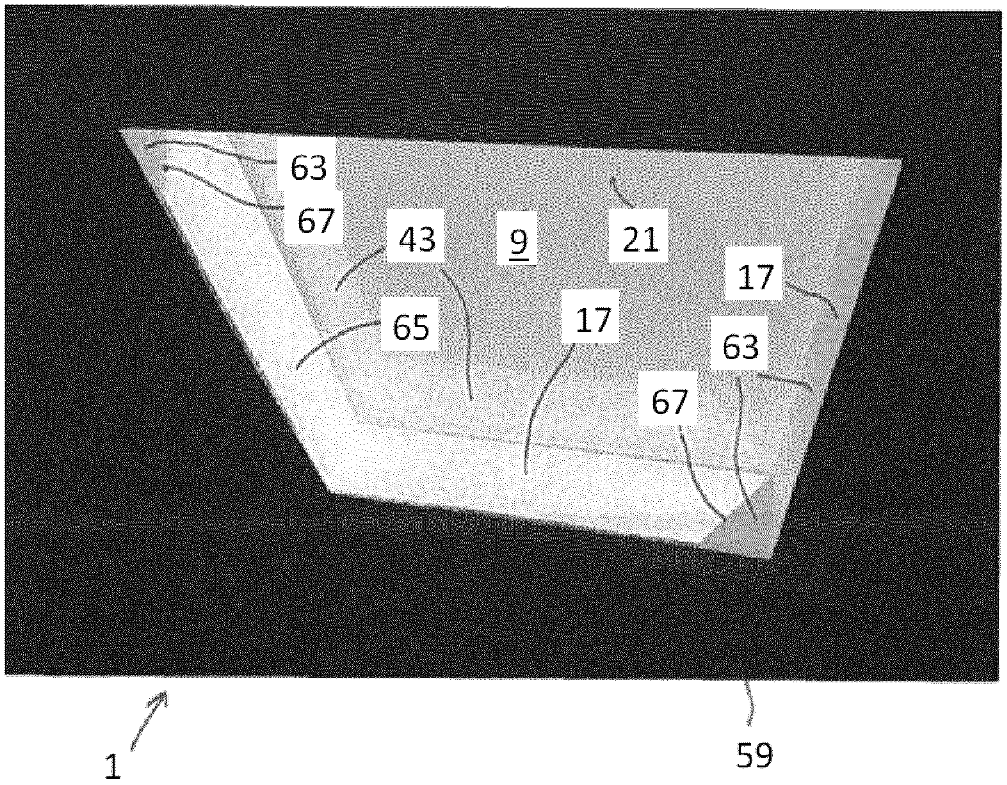
FIG. 6 shows a lighting system built into a false ceiling.

FIG. 6 shows a lighting system 1 built into a false ceiling 59. The first 17 and second wall portion (not visible) thereof are circumferential around the recess 9. The first wall portion is provided with a lighting arrangement (not shown, but see FIG. 4) for controlling at least one of color, intensity, contrast of the illumination, and shape from which light is provided by at least a part 61 of one sub-wall 65 of the first wall portion. Thus, the first side wall comprises light emitting parts 61 and triangular non-light emitting parts 63. Thus an effect of a sharp boundary 67 is created, which replicates the sharp lines created by a distant point light source such as the sun. In this way, the illumination shape appears to have been created by a sunlit light transmitting or generating area. The bright light emitting parts are reflected and clearly visible as virtual images 43 in the transparent pane 21.

Finally, the following is noted:

- the direct light path (hence without being reflected at for example first wall portions 17, see FIG. 4)) from main surface 51 (see FIG. 5) of the light guide up to and including the light exit window is essentially free from a diffuser (the reflection of the first wall portions 17 in the main surface 51 of the light guide is visible from outside downstream the lighting system in an unblurred/specular/non-scattered manner). The approach of the current invention disclosure is to prevent that the reflections of the sidewalls become blurred.
- light area (3) is formed by a light guide which is (back-lit but preferably side-)lit by LEDs, see e.g. description FIG. 5
- enhancing the illusion of being able to “view around the corner” of the clear material pane, into the artificial sky.

It is achieved by i) limiting the view at the clear pane in reducing its surface area with respect to the surface area of the recessed sky panel that is arranged to be slightly spaced apart from the clear pane and ii) in providing inner sidewalls of sufficient height in relation to the height of the spacer. Thus, the artificial sky is suggested to "float" above the clear pane without providing any witness to the spacer and the finite size of a recessed panel.

The invention claimed is:

1. A lighting system comprising:

a light area extending transverse to a main, axial direction, and a side wall extending downstream from the light area, defining a recess with a cross section (Ra), wherein the light area is located at a base of the recess and a light exit window is located downstream at a top of the recess opposite the light area, wherein the side wall comprises a first wall portion and a second wall portion located upstream of the first wall portion, and wherein a transparent pane is provided in between the first and second wall portion, and wherein essentially the whole second wall portion is screened by the first wall portion from all direct lines of view through the light exit window.

2. The lighting system according to claim 1, wherein the light area is formed by a LED panel having a diffuse surface.

3. The lighting system according to claim 1, wherein the transparent pane is specular Fresnel reflective.

4. The lighting system according to claim 1, wherein the first wall portion is capable of emitting light.

5. The lighting system according to claim 1, wherein the sidewall, the first and second wall portion thereof are circumferential around the recess and wherein the first wall portion is provided with a lighting arrangement for controlling at least one of color, intensity, contrast of the illumination, and shape from which light is provided by the first wall portion.

6. The lighting system according to claim 1, wherein the first wall portion having a height H1 comprises a transverse wall portion extending at the transparent pane in a radial direction over a width Wt into the recess having a width Wr for screening the second wall portion having a height H2 from said direct line of view, wherein $$H2<=H1*Wt/(Wr-Wt).$$

7. The lighting system according to claim 1, wherein the first wall portion having a height H1 is offset from the second wall portion by a distance D in a radial direction into the recess having a width Wr for screening the second wall portion with a height H2 from said direct line of view, wherein $$H2<=H1*D/(Wr-2*D).$$

8. The lighting system according to claim 1, wherein the light area and the transparent pane are spaced apart by a distance in the range of 0.1-7.5 cm.

9. The lighting system according to claim 1, wherein the transparent pane extends over the full cross sectional area Ra of the recess at the first wall portion.

10. The lighting system according to claim 1, wherein the transparent pane is made of clear, colorless glass, PMMA or PC.

11. The lighting system according to claim 1, wherein the second wall portion has a white colored, diffuse reflective surface facing the recess.

12. The lighting system according to claim 1, wherein the first wall portion has a white colored, diffuse reflective surface facing the recess.

13. The lighting system according to claim 1, wherein the light area emits light with a color temperature or color correlated color temperature in the range of 6500-20000K.

14. The lighting system according to claim 1, wherein the first wall portion emits light with a color temperature or color correlated color temperature in the range of 3500-6000K.

15. An artificial window or a recessed wall arrangement, wherein the artificial window or the recessed wall arrangement comprises the lighting system according to claim 1.

* * * * *